(12) United States Patent
Johnsen et al.

(10) Patent No.: US 9,887,570 B2
(45) Date of Patent: Feb. 6, 2018

(54) MOBILE VARIABLE POWER SYSTEM AND METHOD

(76) Inventors: Stephen G. Johnsen, Maple Valley, WA (US); Ronald L. Easley, Bonney Lake, WA (US); Kenneth G. Johnsen, Renton, WA (US); Chad M. Hohn, Maple Valley, WA (US)

( * ) Notice: Subject to any disclaimer, the term of this patent is extended or adjusted under 35 U.S.C. 154(b) by 752 days.

(21) Appl. No.: 14/116,692

(22) PCT Filed: May 10, 2012

(86) PCT No.: PCT/US2012/037381
§ 371 (c)(1),
(2), (4) Date: Sep. 4, 2014

(87) PCT Pub. No.: WO2012/154990
PCT Pub. Date: Nov. 15, 2012

(65) Prior Publication Data
US 2014/0375272 A1    Dec. 25, 2014

Related U.S. Application Data

(60) Provisional application No. 61/484,446, filed on May 10, 2011.

(51) Int. Cl.
*H02J 7/14* (2006.01)
*H02J 7/00* (2006.01)
(Continued)

(52) U.S. Cl.
CPC ............ *H02J 7/0065* (2013.01); *B60L 1/006* (2013.01); *B60L 11/005* (2013.01); *B60L 11/16* (2013.01);
(Continued)

(58) Field of Classification Search
CPC ... H02J 7/0042; H02J 7/0054; Y02T 10/7241; Y02T 10/7061; B60L 2200/10;
(Continued)

(56) References Cited

U.S. PATENT DOCUMENTS

| 4,902,955 A | 2/1990 | Manis et al. |
| 5,111,127 A | 5/1992 | Johnson |

(Continued)

FOREIGN PATENT DOCUMENTS

| EP | 2 261 069 A1 | 12/2010 |
| JP | 2010200393 A | 9/2010 |

*Primary Examiner* — Edward Tso
*Assistant Examiner* — Aaron Piggush
(74) *Attorney, Agent, or Firm* — Seed IP Law Group LLP

(57) ABSTRACT

A mobile energy storage apparatus comprised of: a. at least one variable energy control device which converts DC to DC, AC to DC and DC to AC and b. at least one energy storage device (such as a battery) and c. a means to adjust said at least one variable energy control device to various electrical output powers and d. a means to connect said mobile energy storage apparatus to an EV (electric vehicle) or other device electrically and mechanically to enable transferring energy even when in motion and e. optionally a means for attaching various covers to said mobile energy storage apparatus to suit various applications. The mobile energy storage apparatus allows the transfer of energy to or from: an EV, a building or any other electrical facility or device and can be configured with built-in or attached to various power sources.

10 Claims, 11 Drawing Sheets

(51) Int. Cl.
  *B60L 11/00* (2006.01)
  *B60L 11/16* (2006.01)
  *B60L 11/18* (2006.01)
  *B60L 1/00* (2006.01)

(52) U.S. Cl.
  CPC ....... *B60L 11/1816* (2013.01); *B60L 11/1824* (2013.01); *B60L 11/1864* (2013.01); *B60L 11/1877* (2013.01); *B60L 11/1879* (2013.01); *B60L 11/1896* (2013.01); *H02J 7/0054* (2013.01); *H02J 7/0055* (2013.01); *B60L 2200/10* (2013.01); *B60L 2200/12* (2013.01); *B60L 2200/26* (2013.01); *B60L 2200/28* (2013.01); *B60L 2200/30* (2013.01); *B60L 2200/32* (2013.01); *B60L 2200/36* (2013.01); *B60L 2210/10* (2013.01); *B60L 2210/40* (2013.01); *B60L 2230/16* (2013.01); *B60L 2230/24* (2013.01); *B60L 2230/30* (2013.01); *B60L 2250/16* (2013.01); *B60L 2260/22* (2013.01); *B60L 2260/32* (2013.01); *H02J 7/0042* (2013.01); *H02J 2007/0067* (2013.01); *Y02T 10/7022* (2013.01); *Y02T 10/7061* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/34* (2013.01)

(58) Field of Classification Search
  CPC .............. B60L 2200/28; B60L 11/1816; B60L 11/1855; B60L 11/1877
  USPC ................................ 320/104, 113, 136, 162
  See application file for complete search history.

(56) References Cited

U.S. PATENT DOCUMENTS

| | | |
|---|---|---|
| 5,559,420 A | 9/1996 | Kohchi |
| 6,140,799 A | 10/2000 | Thomasson |
| 7,795,837 B1 | 9/2010 | Haun et al. |
| 8,120,310 B2 | 2/2012 | Littrell et al. |
| 8,627,908 B2 * | 1/2014 | Wellborn ............... B62D 59/04 180/14.2 |
| 2007/0194626 A1 | 8/2007 | Eager et al. |
| 2009/0079161 A1 * | 3/2009 | Muchow ................ F03D 1/001 280/400 |
| 2010/0065344 A1 * | 3/2010 | Collings, III ......... B60L 11/126 180/2.1 |
| 2010/0141201 A1 * | 6/2010 | Littrell ..................... H02J 7/35 320/101 |

* cited by examiner

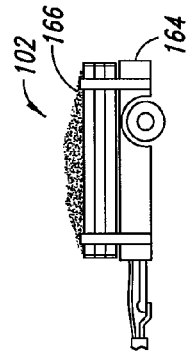
FIG. 6A
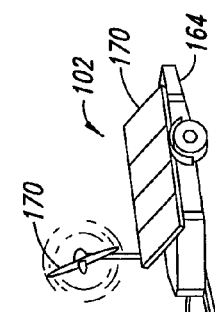
FIG. 6D
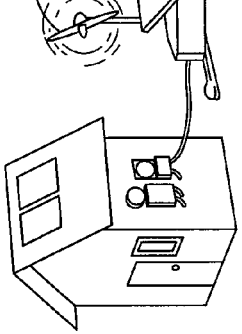
FIG. 6G
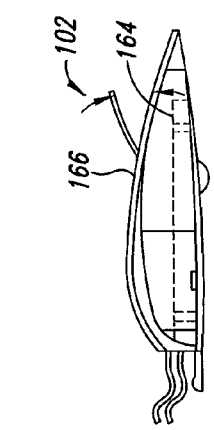
FIG. 6J
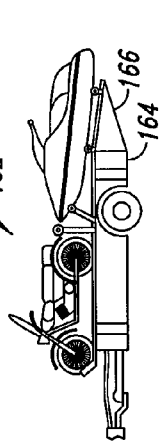
FIG. 6B
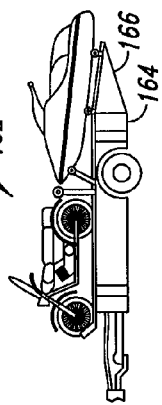
FIG. 6E
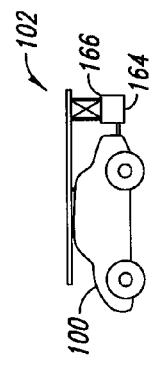
FIG. 6H
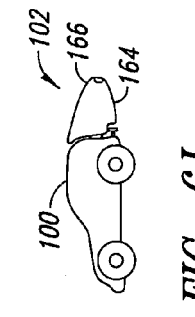
FIG. 6C
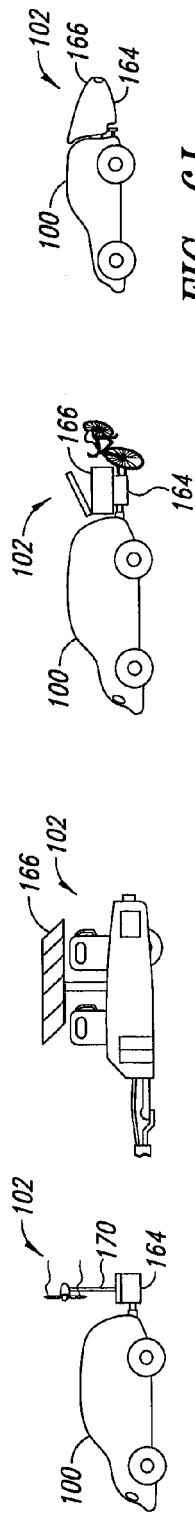
FIG. 6F
FIG. 6I

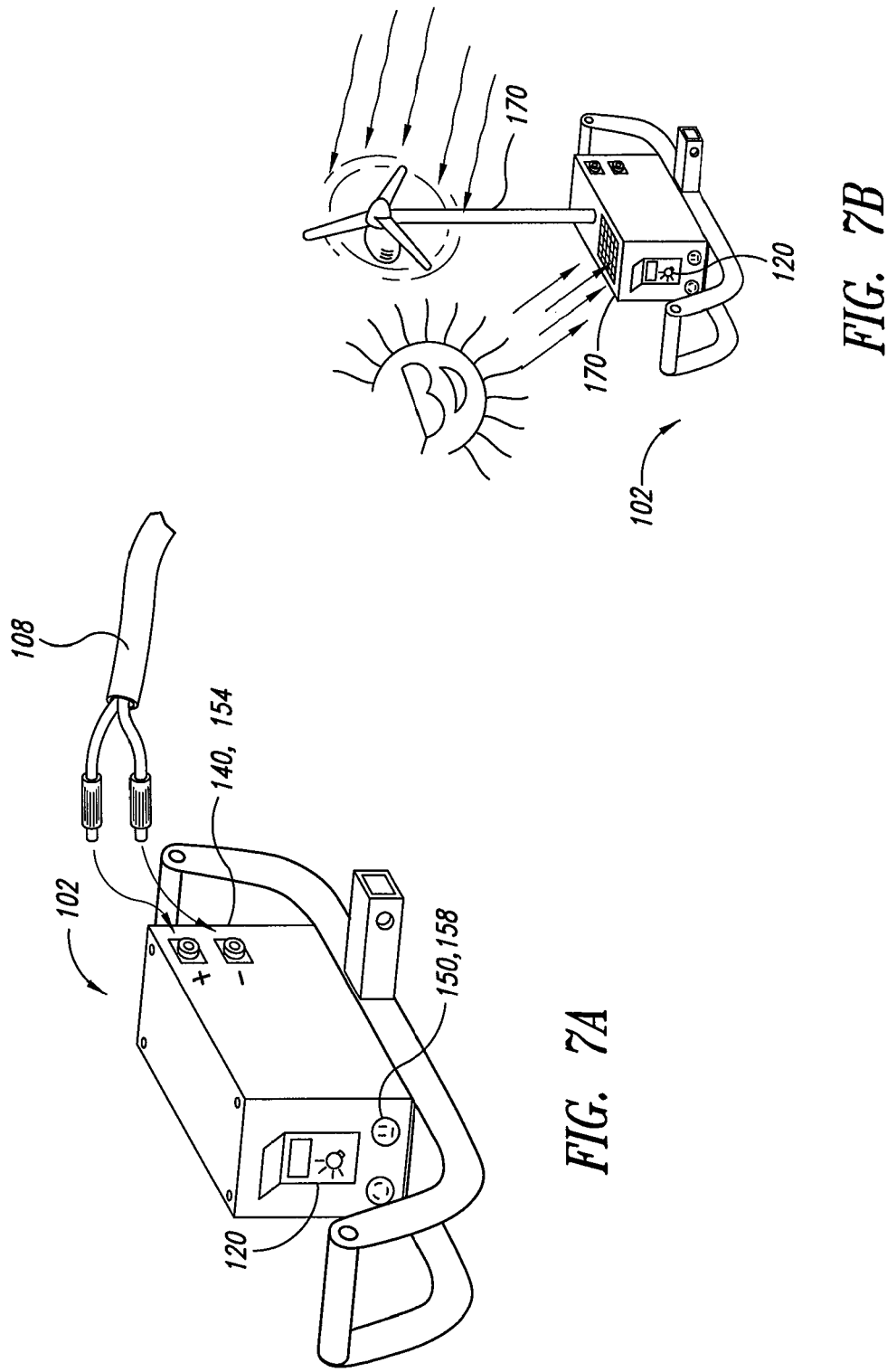

MOBILE VARIABLE POWER SYSTEM AND METHOD

BACKGROUND

Technical Field

The present disclosure pertains to apparatus, systems and methods for providing power to electric vehicles and other electrical objects or systems using a mobile energy storage apparatus that has variable power inputs and outputs.

Description of the Related Art

At the time of this writing, the combustion engine is the most common form of propulsion for land vehicles, water craft, and aircraft. The most common combustion engines are fueled by petroleum or other fossil fuels, which are in limited supply on this planet. It would be advantageous to have a flexible solution for propulsion that does not rely on one energy source.

Electricity is an option and there are many methods of producing it. Whereas combustion fuels rely on limited supply or limited land area to grow fuel, electricity generation has a number of sources including but not limited to: wind, solar, tidal, wave, geothermal, nuclear, coal, natural gas, diesel, gasoline, and more. High levels of electrical power can be nearly instantaneously transmitted long distances through small conductors in a safely controlled manner and generally with little or no sound. For these and other reasons, almost all modern lighting is based on electricity instead of combustion as it was in years past. Similarly, residences and other buildings and facilities are primarily powered by electricity that is brought in by wire from power stations instead of local combustion sources.

In some stationary and many mobile situations where an electric vehicle, craft, device (such as a portable welder) or residence or other electrically powered facility is not positioned near a permanent or reliable electrical power source, a common method for delivery of electricity is from a combustion engine generator. This is also the most common option for most homeowners who want a backup power solution available for emergencies. Some residences and other facilities have a solar or wind power system that usually has a backup generator and/or a large, heavy and stationary battery backup system. For much of their lifetime, these backup systems just sit unused. Furthermore, they are bulky, heavy, and designed for stationary use rather than being mobile. In limited cases where an auxiliary power system uses clean and quiet sources, such as solar, is mobile, as in U.S. Pat. No. 7,795,837 B1: "PORTABLE SOLAR POWER SUPPLY TRAILER WITH A SECURITY CONTAINMENT AREA AND MULTIPLE POWER INTERFACES", it is limited to supplying standard AC service voltage (110-240 VAC) and very low voltage DC power (below 54 VDC) and due to the trailer's size it still needs to be towed using a vehicle that would most likely be fueled by a liquid petroleum fuel to have the range and power to tow the trailer to the site. This reference does not consider being able to move a backup power generation or storage system to wherever it was needed or desired, thus greatly increasing its ability to be useful. Such a transportable system could also not be limited to providing standard AC service voltage and low voltage DC power and could instead also provide additional energy at higher voltages and currents to an electric vehicle and extend its range.

Furthermore, as the population increases and electrical demands increase and fluctuate, there is an increasing need for electrical load-leveling and management capabilities, and it would be advantageous for there to be more distributed power generation and storage capacity. Additionally, when military or other operations require remote power generation, current systems use a hot, exhaust emitting, and loud combustion generator that is powered from a flammable fuel source.

Applications, such as land and water transport where the power source moves with the vehicle, rely almost exclusively on an onboard combustion process to provide mechanical and/or electrical power. As the population increases and vehicle use rises, there is increasing interest in electric propulsion. Unfortunately, the use of electric vehicles (EVs) is traditionally limited either by wires that run overhead or underneath the electric vehicle or by energy stored in batteries, fuel cells, or other onboard storage means. At the time of this writing, fuel cells are extremely expensive as are the best batteries and ultra capacitors. Furthermore, most fuel cell systems require supplemental batteries to augment the power output and assist during the system start-up phase (especially in colder temperatures).

A characteristic of an electric vehicle's battery pack is that the voltage does not always remain at one constant level. As the electric vehicle's battery pack is depleted the available voltage drops and overall power is reduced. Also, heavier electric vehicles require more power for movement, thus consuming more energy. This all relates to Ohm's Law, which states that Voltage (V) multiplied by Amperage (I) equals Power (P). Additionally, a battery or battery pack does not perform as well when higher amperage is demanded. In fact, the voltage tends to drop lower and lower the more the amperage increases. Since total power is the product of the system voltage and amperage (P: V·I), it turns out that the higher the system voltage the less amperage is needed for any given amount of power.

Due to the current state of battery and fuel cell technology, and because common combustion engine fuels like gasoline or diesel carry so much more energy per weight and volume than batteries or fuel cells, electric vehicles including fuel cell vehicles and hybrids usually contain relatively small battery packs and have limited electric range when compared with average internal combustion engine vehicles. This fact and the unavailability of extremely high power rapid charge stations at the time of this writing and the associated potential risks to battery health from the extra high power rapid charging, leads most pure battery electric vehicle users to limit their driving to shorter distances and not consider long road trips or interstate or intercountry travel. In limited locations where there are extra high power rapid chargers, they place a large load on the electrical grid, which could overload the system if there is a lot of load in that area of the electrical grid circuit. There is a manufacturer of extra high power rapid chargers, Kanematsu, which has a fast charger with backup battery installed at Portland State University that charges its backup batter at a lower rate and which supplements power from the grid when charging an electric vehicle so as not to put such a large load on the grid. A disadvantage of both fast chargers powered solely from the grid and fast chargers with a battery backup system is that they are large stationary devices that can't be moved to any location where fast charging is needed. Although hybrid vehicles may be used on longer trips, they must rely on their combustion engine, and the actual miles traveled per gallon of fuel consumed is not as favorable as when the electric portion of the system is able to provide sole driving power.

For this reason, there have been aftermarket manufacturers of some plug-in range extender kits to allow extended electric-only driving for hybrids, such as plug-in Prius kits like the one developed by Hymotion. A disadvantage of these kits is that, with current battery technology, they do not add significant range for long trips and is a permanent fixture in the vehicle, adding extra weight and is not versatile in operation with other vehicles to be moved between different models of hybrid vehicles.

There have been some solutions for providing power to EVs in remote locations or even while driving; however, they are usually limited to large, ungainly devices and are almost always tailored to a specific vehicle. This is due in part to the lack of standardization by the builders of electric vehicles. Many different electric vehicles and components use different voltage levels. When a power source is used, it has to be sized to the appropriate voltage level for that device. Just like the battery in one cell phone may not work with another cell phone, the battery pack of one electric vehicle is not likely to work in any other electric vehicle.

In fact, if the safe charging or operating voltage levels of a given system are exceeded, the results can lead to permanent damage or even fire or explosion. U.S. Pat. No. 8,120,310 B2: "METHODS AND SYSTEMS FOR CHARGING ELECTRIC VEHICLES USING SOLAR POWER" describes a two-wheeled road-going electric vehicle trailer that is limited to solar power as the energy source for the electricity it supplies to the electric vehicle. It requires a charging controller to be placed on the electric vehicle, permanent and specific to that vehicle, to accept the power output from the trailer and adjust it to properly supply a safe power level to the electric vehicle. It also requires an additional device, a power converter, to take the power from the solar panels and convert it to a form suitable for the onboard battery backup system or to supply to the charge controller on the electric vehicle. This adds an extra system of complication to the trailer.

Another range extending trailer, Steve Hawkins' RXT-B (Range Extending Trailer-Battery), allows the user to charge it from AC power, but it requires a dedicated electric vehicle charging station to do so, decreasing the flexibility of where you charge it. It also has a fixed voltage output to be compatible with only one model of electric vehicle.

U.S. Pat. No. 5,559,420 entitled "ELECTRICITY SUPPLY UNIT TRAILER FOR ELECTRIC VEHICLES" also requires an off-board charger for its batteries, although the battery pack is removable for quick swapping from the trailer, that requires that there are multiple other battery packs readily available to swap with, requiring greater investment in batteries.

Both the RXT-B trailer and U.S. Pat. No. 5,559,420 can only power electric vehicles and cannot provide auxiliary AC power. U.S. Pat. No. 5,559,420 can vary output voltage, but it requires physically changing battery connections to make more or less series or parallel connections, requiring complicated mechanisms or time consuming labor and only producing a finite number of settings for voltage and maximum current. None of these references suggest having an auxiliary energy supply solution that could accept a wider range of power sources as well as employ a means of easy or even automatic adjustment of the unit's output levels such that it could be used with a variety of electric vehicles and not necessarily require a specific charge controller on the electric vehicle.

Electric vehicle manufacturers usually do not place large battery packs in the electric vehicles because the larger battery packs would add much extra volume and weight and because the majority of driving does not require extreme range. As a result, it is not feasible for most electric vehicle users to use their EV when they do wish to travel long distances. Trailers are almost always frowned upon for electric vehicle use since they add weight, increase rolling resistance, and sometimes more aerodynamic drag.

Known EV trailer designs usually rely on a combustion engine for some or all of the power because the combustion engine fuel allows for a lighter weight and smaller trailer. These trailers are generally designed for a specific vehicle, they are noisy, prone to increased maintenance, produce emissions, and usually achieve poor miles-per-gallon ratings compared to pure battery electric vehicles while still being reliant on a limited fossil fuel source. This is true 100% of the time they are operating because they don't have an alternate onboard energy source such as electric batteries. Two such examples of combustion engine powered generator trailers for extending the range of electric vehicles which have these drawbacks are U.S. patent application Ser. No. 12/557,788: "SELF PROPELLED ELECTRIC VEHICLE RECHARGING TRAILER" and the AC Propulsion BEV RXT-G (Battery Electric Vehicle Range Extending Trailer-Generator) "Long Ranger". U.S. patent application Ser. No. 12/557,788 has incorporated its own propulsion means so as to offset the added weight by assisting with motive power. With the added electric propulsion source, it adds mechanical complication and more moving parts and increased cost and complexity to have a control unit which provides the right amount of propulsion for the trailer. Again, none of these references suggest being able to have a trailer or other transportable device that could easily be attached to the EV and adjusted to provide the desired power. They further do not recognize that it would be ideal if there were some way for the device to offset its added weight, and if it had the option to use batteries and or other power sources to augment or completely do away with the combustion engine generator.

The following references also share additional disadvantages, U.S. Pat. No. 8,120,310 B2: "METHODS AND SYSTEMS FOR CHARGING ELECTRIC VEHICLES USING SOLAR POWER; U.S. Pat. No. 5,559,420: "ELECTRICITY SUPPLY UNIT TRAILER FOR ELECTRIC VEHICLES"; U.S. patent application Ser. No. 12/557,788: "SELF PROPELLED ELECTRIC VEHICLE RECHARGING TRAILER"; Steve Hawkins' RXT-B (range extending trailer-battery); and AC Propulsion BEV RXT-G (Battery Electric Vehicle Range Extending Trailer-Generator) "LongRanger" share. For example, all of them are in a trailer form, using wheels, and towed behind an electric vehicle, which can add unnecessary size to the overall vehicle assembly and make maneuvering more difficult. They all also have the added weight and bulk of the trailer frame that is required to be strong enough in a low profile form to support the extra load of all of their components and equipment on top of the frame. The last four of five of the trailers listed have little capability for cargo storage, or any other function that common trailers typically perform. This means that a trailer is being towed by the electric vehicle for increased range without the benefit of performing any of the functions that trailers typically perform, such as hauling cargo of general bulk form or of a specialized form that requires a purpose built trailer.

BRIEF SUMMARY

The present disclosure is directed to an energy storage and supply source, such as a trailer or detachable onboard apparatus employing a user-adjustable variable energy control device that can be mounted on the trailer or integrated into the onboard apparatus and which attempts to automatically apply a high voltage that is equivalent, or as close as possible, to the maximum voltage that the host/tow electric vehicle battery pack or systems can accept.

As discussed above, the higher the voltage in an electric vehicle, the less amperage is required and the more efficient the overall systems function. This is due to a basic electrical principle of Ohm's Law which states that V*I=P, which means voltage multiplied by amperage equals power. Additionally, a battery or cell will give out more energy and perform better the lower the amount of amperage that is being drawn from it. This holds true when there is a plurality of cells or batteries in an electric vehicle battery pack. Understandably, it would be advantageous to keep the electric vehicle's battery pack voltage as high as possible in order to keep the amperage demands lower, thereby improving performance and extending the useful range of the electric vehicle.

Electric vehicle users notice better performance and the ability to get the same performance while depressing the electric vehicle's accelerator pedal assembly less deeply when the electric vehicle has a full charge and especially when the electric vehicle has just been fully charged and the system voltage is at its highest. Understandably it would be advantageous to be able to always have the electric vehicle's battery pack and systems being charged and at as high a voltage as safely acceptable. This is akin to the easily recognizable power advantages of a constantly powered corded electric hand drill versus the diminishing power of a battery powered electric hand drill. The heavier the load on the battery powered drill, or the longer it has been used, the lower the voltage drops and thus the power and effectiveness of the device is negatively affected.

It is not practical to drive an electric vehicle only as far as an extension cord would allow and, accordingly, the result is that the power diminishes as the onboard battery voltage drops. By adding a device on the special range extending apparatus that keeps supplying desirable high voltage to the host/tow electric vehicle, it is effectively the same as charging the host/tow electric vehicle's battery pack as it is being driven. By connecting the output from the trailer or onboard apparatus to the most positive and negative connections on the host/tow electric vehicle's battery pack, it has the effect of keeping the host/tow electric vehicle's battery pack at or near the fully charged level while also allowing for the host/tow electric vehicle's battery pack to provide additional power in conjunction with the trailer or onboard apparatus, which can be useful for high power operations such as passing, accelerating or going up steep hills.

This should not be construed as limiting the device to working with another energy storage system. Of course the add-on trailer or onboard apparatus could also provide power to the electric vehicle without there even being any battery pack on or in the electric vehicle.

BRIEF DESCRIPTION OF THE DRAWINGS

The foregoing and other features and advantages of the present invention will be more readily appreciated as the same become better understood from the following detailed description when taken in conjunction with the accompanying drawings, wherein:

FIGS. 6A through 6J are schematic diagrams of various embodiments for removable and interchangeable tops for the mobile energy storage apparatus which serve different functions;

FIGS. 7A and 7B are schematic diagrams of one embodiment of the mobile energy storage apparatus which show the control interface, AC and DC input and output connection means, connector, and one embodiment of electrical generation devices connected to the mobile energy storage apparatus;

DETAILED DESCRIPTION

It should be made clear at this point that whenever the words "Electric Vehicle" or "EV" are used in this document, they can refer to any vehicle with some means of electric propulsion. Vehicle as used herein includes manned and unmanned machines, crafts, and vehicles used in the air, on the land, or on the water, included submerged vehicles. This includes but is not limited to hybrid automobiles or trucks, fuel cell vehicles, pure battery electric vehicles and even diesel-electric or fully electric watercraft, buses, flying machines, and railed or rail riding or track guided vehicles such as trains, monorails, and magnetic levitation vehicles. The fundamental electric principles apply to all devices and systems with an electric component.

Apparatus Mobilization Methods:

FIGS. 1A through 1E and FIGS. 2A through 2B show several embodiments of mobile transportation, such as a motor vehicle 100, using a mobile energy storage apparatus 102 formed in accordance with the present disclosure. The mobile transportation can be enabled by at least one friction reducing device (such as a wheel, a track/tread, a hovercraft curtain and fans, or magnetic levitation) or shape (as in a boat hull, hydrofoil, inflatable floatation device, or ski) attached to an apparatus frame 160 or formed to be integral with the shape of the apparatus frame 160 as a whole (as in a boat hull, or hovercraft curtain and fans). In those mobilization embodiments, the mobile energy storage apparatus 102 would be similar to a vehicle trailer that is towed behind a vehicle (such as an electric vehicle 100).

In another embodiment, the mobile energy storage apparatus 102 is attached to a vehicle (such as an electric vehicle 100) without any separate method of enabling mobility (such as being suspended from a towing hitch mount, attached to a roof rack, or stowed inside cargo space of the vehicle.

Figure 3:
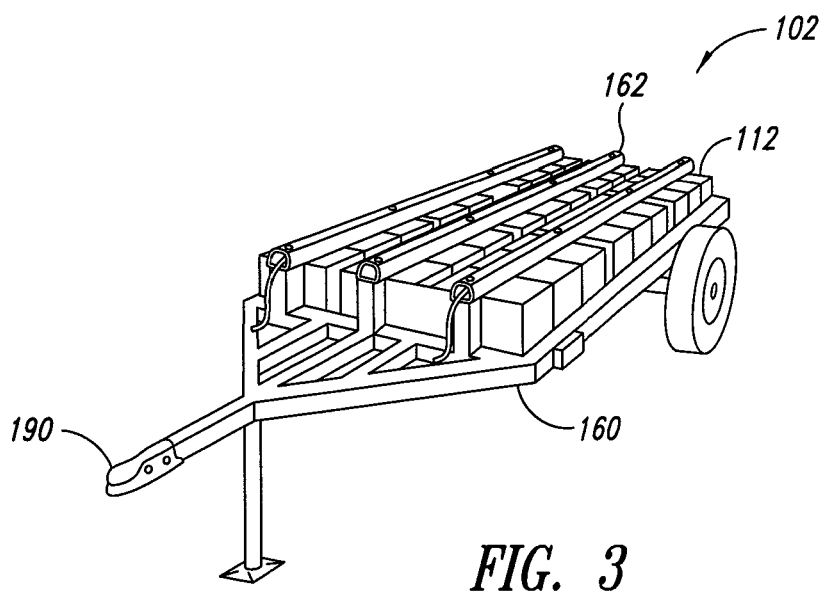
FIG. 3 is a schematic diagram of one embodiment of the mobile energy storage apparatus showing the apparatus frame, energy storage devices, and securing means.
Figure 4A:
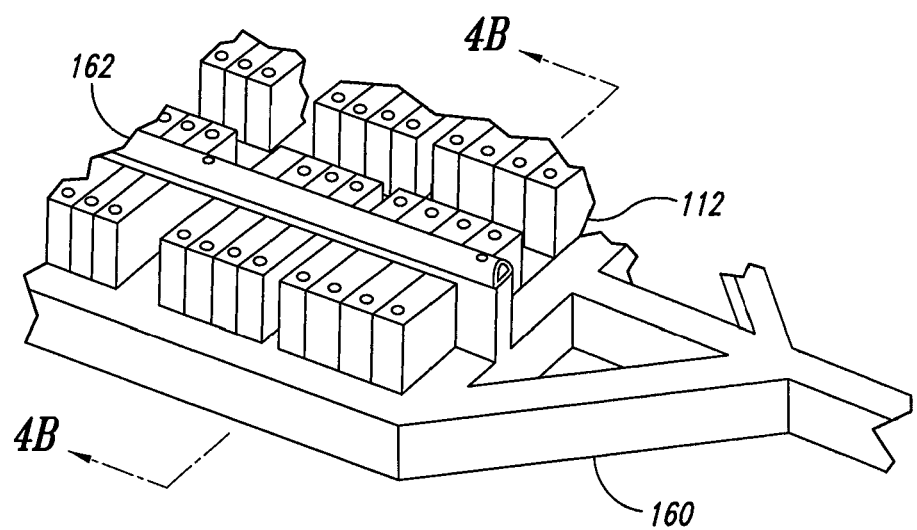
FIGS. 4A and 4B are schematic diagrams of one embodiment of apparatus frame, energy storage devices, and securing means.
Figure 4B:
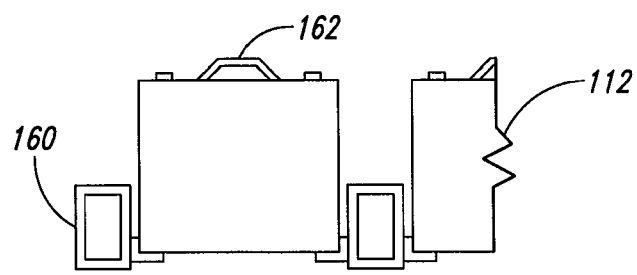

Apparatus Frame:

FIGS. 3, 4A and 4B show an apparatus in the form of a trailer frame 160. It is a metal frame that is assembled out of pieces by either welding, adhesive, or bolting or fasteners of some sort. The frame 160 may be forged or machined out of a piece of metal or, in the alternative, it may be made of composite materials using typical methods for composite construction. The frame 160 may also be cast from any typical material used in any casting process. Yet another method for constructing the frame may be rotational or injection molding using any typical material suitable for that process. Another possible method of construction would be using wood or partially wood-based materials or any of various combinations of two or more of the foregoing materials.

Energy Storage:

FIG. 3 shows one embodiment of energy storage comprising energy storage devices 112, such as batteries. Energy storage is comprised of at least one energy storage device 112, or a plurality of energy storage devices 112, that stores energy in the form of: chemical energy (as in a battery or fuel cell), gravitational potential energy (as in a water tower), kinetic energy (as in a flywheel), electric energy (as in capacitors), thermal energy (as in a steam boiler), strain energy (as in rubber bands or springs), pressurized potential energy (such as a pressurized gas or fluid in a pressure vessel), or a combination of different energy storage forms listed above, and produces an output of electrical energy. The energy storage device(s) 112 may be electrically connected in series, parallel, or a combination of the two, to produce a certain design voltage and/or current desired.

Power Generation:

FIG. 7B shows one embodiment of The mobile energy storage apparatus 102 with electrical generation device(s) 170. The mobile energy storage device 102 may have one or more electrical generation devices 170 as a component of the system that may include one or more energy storage devices 112 as part of the system. Examples of electrical generation devices 170 include, but are not limited to, a solar photovoltaic panel array, generators powered by the combustion of fuels, powered by a nuclear reactor, or powered by humans or other living creatures or organisms.

Energy Storage Device Regulation:

The energy storage device(s) 112 would have regulation device(s) (not shown) (such as a battery management system) connected to them to monitor parameters related to the level of energy storage in the energy storage device(s) 112. The regulation device(s) provide feedback to a variable energy control device 110 to have the variable energy control device 110 change its level of electrical output if necessary. The regulation device(s) could also allow the energy storage device(s) 112 to accept different rates of energy input if there are multiple energy storage devices 112 in the circuit and they are at different states of energy. Preferably, there would also be a system for transferring energy from the energy storage device(s) 112 that are most full to the energy storage device(s) 112 that need more filling in order to more efficiently equalize the energy storage device(s) 112.

Securing the Energy Storage Device(s):

FIGS. 3, 4A, and 4B show one embodiment for a securing apparatus 162 of the energy storage device(s) 112, in this case using structural tie-downs 162. The ability to secure the energy storage device(s) 112 may be designed into the apparatus frame 160 or structure of the entire mobile energy storage apparatus 102. Weight and even volume can be saved by designing the securing apparatus 162 (such as structural tie-downs into the main structure of the mobile energy storage apparatus 102 itself. The apparatus frame 160 itself may secure the energy storage device(s) 112 vertically or laterally or both, and the securing apparatus 162 fastened to the apparatus frame 160 would provide supplemental restriction to secure the energy storage device(s) 112 so that they are secured both vertically and laterally.

The securing apparatus 162 may actually provide additional strength to the apparatus frame 160 as a whole, so that the apparatus frame 160 may be lighter and smaller due to the additional strength provided by the securing apparatus 162. Together the entire mobile energy storage apparatus 102 would be more rigid.

There is a distinct advantage to using the apparatus frame 160 itself to secure the energy storage device(s) 112 vertically or laterally or both because the apparatus frame 160 materials are used more efficiently than if additional materials were needed to secure the energy storage device(s) 112. Also, by the securing apparatus 162 being fastened to provide supplemental restriction of the energy storage device(s) 112 to the apparatus frame 160, it provides extra flexural rigidity and strength to the apparatus frame 160, allowing the apparatus frame 160 to be designed for even further efficient use of materials and thus reducing weight.

Circuit Protection:

The electrical circuit containing the energy storage device(s) 112 has at least one circuit protection device (not shown) (such as a fuse, circuit breaker, automated sensing disconnect, or manual disconnect) that will open the circuit in the event that the electrical current in the circuit exceeds the amount desired. Manual disconnects may aid service personnel or emergency responders working on or around the energy storage device(s) 112 or mobile energy storage apparatus 102 as a whole by making it safer than a complete circuit with higher energy potentials than if it was disconnected into smaller segments of the circuit. There could also be a device to automatically open circuits if a crash were detected or imminent.

Figure 9A:
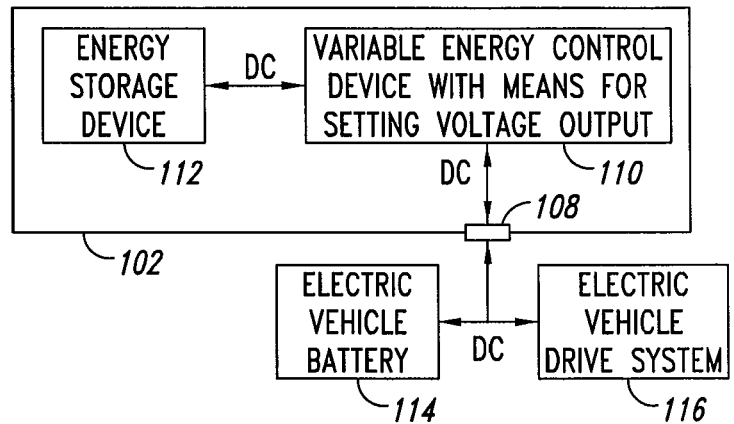
FIGS. 9A and 9B are block schematic diagrams of the mobile energy storage apparatus connected to an electric vehicle and able to supply power to and from the electric vehicle battery pack and electric vehicle drive system.
Figure 9B:
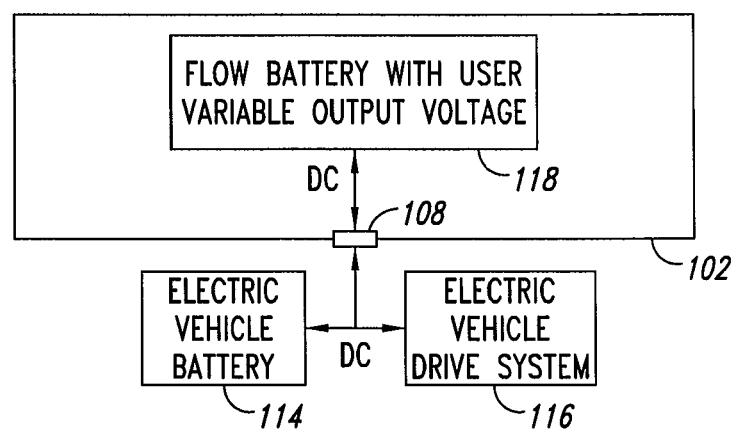
Figure 10:
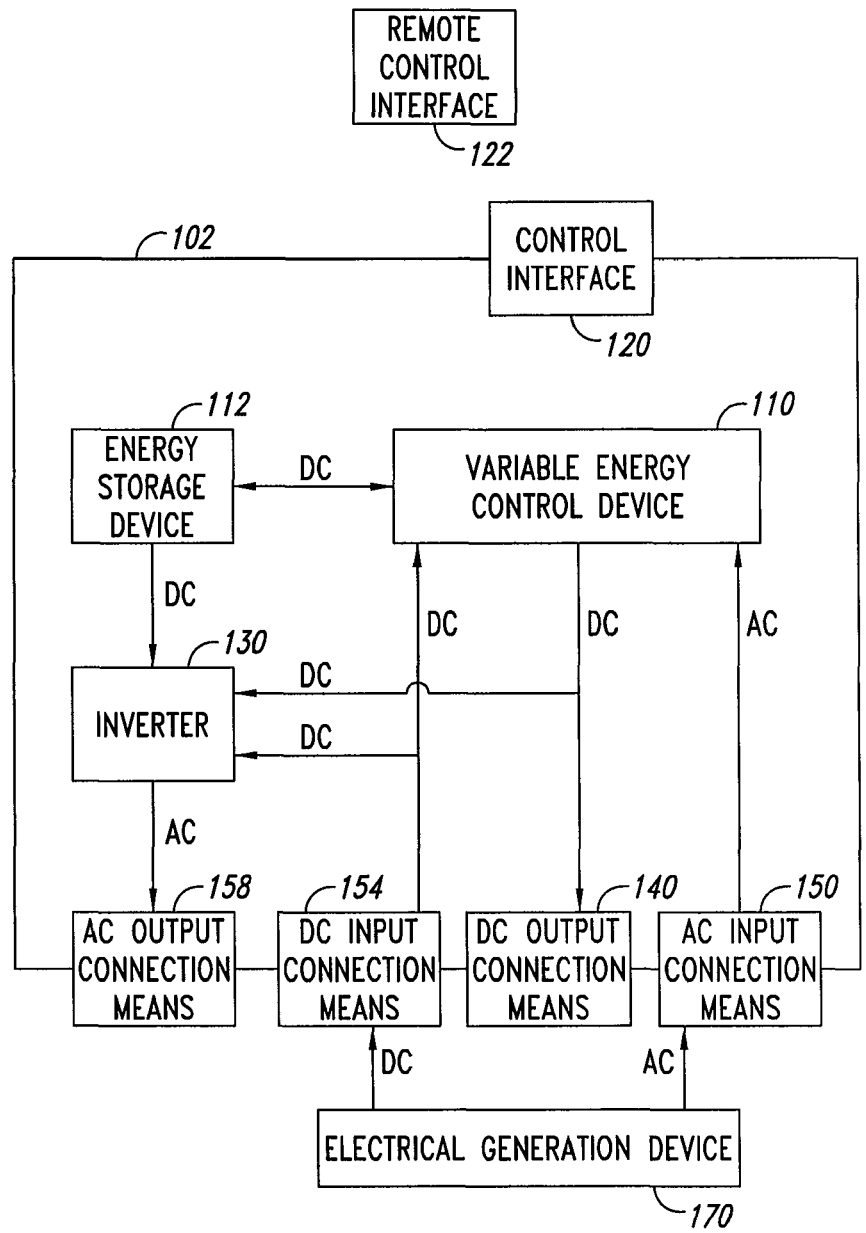
FIG. 10 is a block schematic diagram of the functions of the mobile energy storage apparatus able to input and output AC and DC electrical power.

Electrical Power Input/Output:

FIGS. 9A, 9B, and 10 show block schematic diagrams of the functions of the mobile energy storage apparatus 102 which may input or output in either AC or DC electrical power. A flow battery/rechargeable fuel cell 118, as shown in FIG. 9B, can input or output AC or DC power. An inverter 130, as shown in FIG. 10, can output AC power from an input of DC power. A variable energy control device 110, such as, but not limited to, a variable input and output battery charger, DC/DC converter, or power supply unit, and can take an input of AC or DC power and outputs DC power, as shown in FIGS. 9A and 10. A combination of these devices that allow the mobile energy storage apparatus 102 to take an input of AC or DC power and output AC or DC power may be used. A combination of these devices is located on the mobile energy storage apparatus 102 and would be electrically connected to the energy storage device(s) 112. The variable energy control device 110, flow battery/rechargeable fuel cell 118, and the inverter 130 may also be electrically connected to any of the following, depending on the desired function at the time: an AC or DC powered electric vehicle 100 (including but not limited to a passenger car, passenger truck, motorcycle, cargo transport truck, trolley, wheeled train, magnetic levitation train, other magnetic levitation vehicle, monorail, boat, snowmobile, flying machine, blimp, balloon, or hovercraft), an AC electrical connection (a receptacle as part of an electrical grid), an AC electrical generator, an AC powered building or home, or device (such as AC power tools), a DC powered building, home, or device (such as a welder), an auxiliary energy storage device(s) (such as a set of one or more batteries), or an onboard or off-board electrical generation device(s) 170 (such as photovoltaic panel(s), wind turbine(s), fuel cell(s), hydropower turbine(s), thermal powered turbine(s), geothermal generation, tidal power generation, wave power generation, nuclear reactor(s), human power or other living creature or organism power generation, or any DC power source). Of course the scope of the device should not be limited to the examples that are listed above.

The variable energy control device 110 has a variable voltage and current input/output that is easily user-adjustable to be compatible with the input of equipment it is being connected to. The variable energy control device 110 will also limit the output current to zero as the voltage of the equipment it is connected to approaches the output voltage setting of the variable energy control device 110. Wired or wireless communications or controls are preferably connected between the mobile energy storage apparatus 102 and an electric vehicle 100, a building, a home or a computerized processing device (such as a laptop computer, tablet computer, a PDA, or a smart phone) through a remote control interface 122. The interface can consist of, but is not limited to, an analog display and controls (such as a needle dial, a roll dial, switches, knobs, buttons, etc.) and digital display and controls (electronic display screen, touch screen, embedded circuitry, software, etc.) The communications lines can transmit information to and from a display that shows parameters of the variable energy control device 110, the energy storage device(s) 112, or both, to facilitate remote control and parameter and function adjustment. It is also possible that GPS and or altitude information and trends could be captured and used for determining power required during a mobile mode (such as when supplying power to an electric vehicle 100). Furthermore the connection of any of the components electrically or for transferring energy could be conductive, inductive or other methods.

Figure 8:
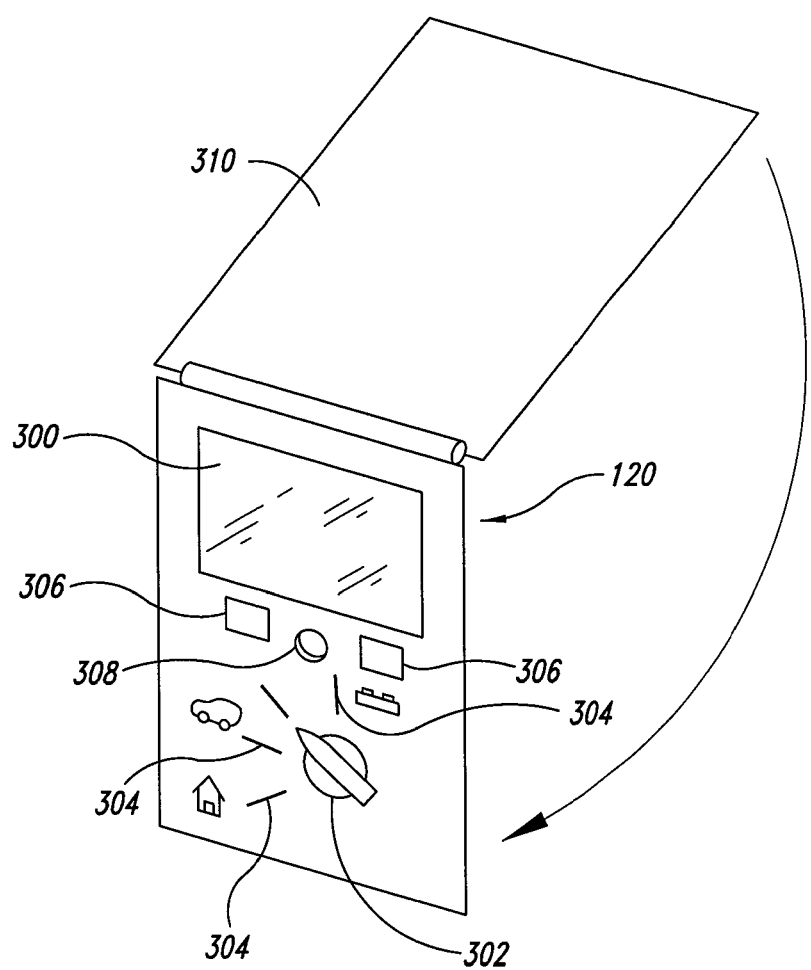
FIG. 8 is a schematic diagram of one embodiment of the control interface.

FIGS. 7A and 8 show the mobile energy storage apparatus 102 to preferably have display and controls through a control interface 120 that can consist of, but is not limited to, an analog display and controls (such as a needle dial, a roll dial, switches, knobs, buttons, etc.) and digital display and controls (electronic display screen, touch screen, embedded circuitry, software, etc.). The control interface 120 may consist of an info display 300, a function mode selector 302, a function mode indicator 304, a navigation/selection device 306, an adjustable knob 308, and a system to access and protect the display 310.

Figure 1A:
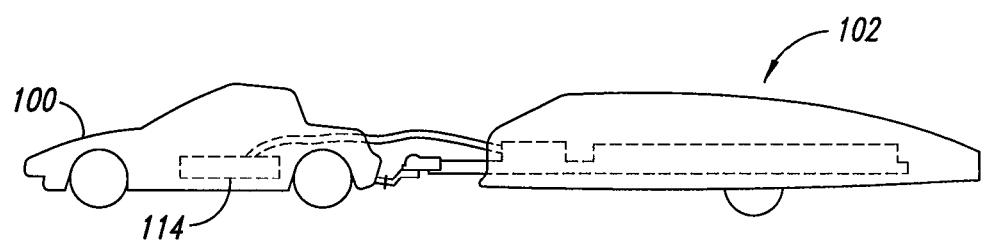
FIGS. 1A through 1E are schematic diagrams of various possible embodiments of the mobile energy storage apparatus connected to electric vehicles.
Figure 1B:
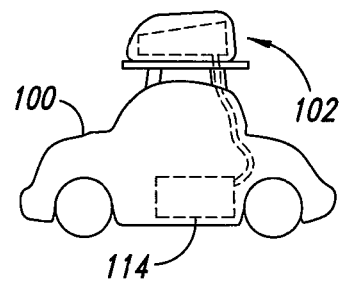
Figure 1C:
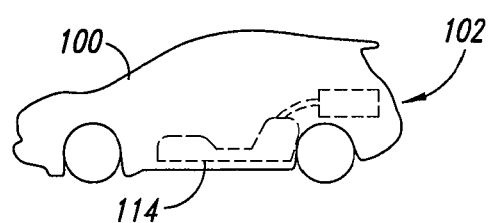
Figure 1D:
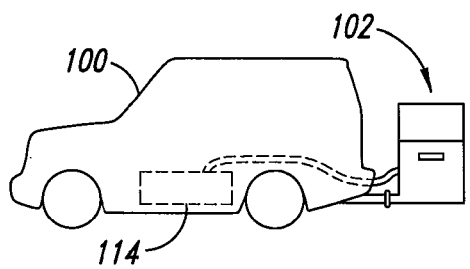
Figure 1E:
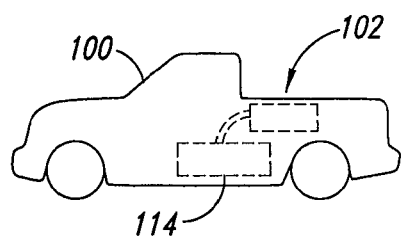
Figure 2A:
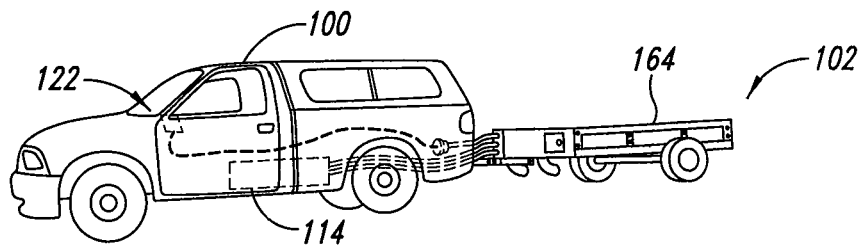
FIGS. 2A and 2B are schematic diagrams of one embodiment of the mobile energy storage apparatus connected to an electric vehicle showing the lid, means for securing various tops, and one embodiment the remote control interface in an electric vehicle.
Figure 2B:
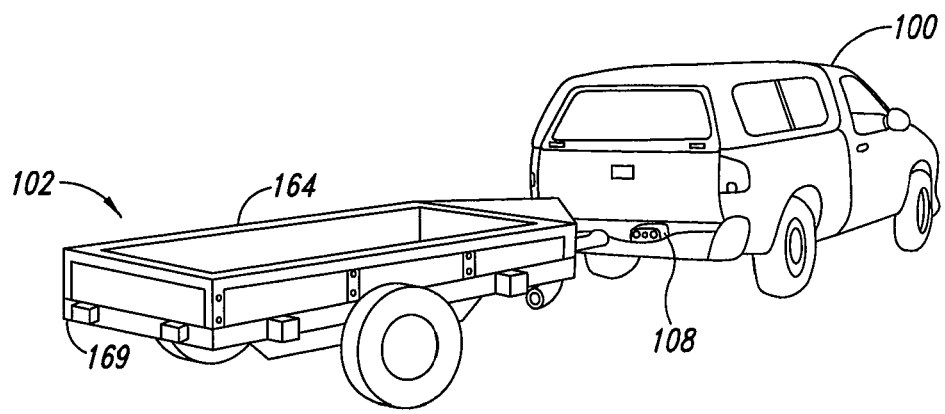

Lid:

FIGS. 2A and 2B show one embodiment for at least one lid 164 designed to cover components of the mobile energy storage apparatus 102 to protect them from weather and to protect users and the public from potential hazards. Ideally, the lid is constructed of materials and designed to be strong and rigid enough to provide a surface on which cargo could be stored.

Figure 5A:
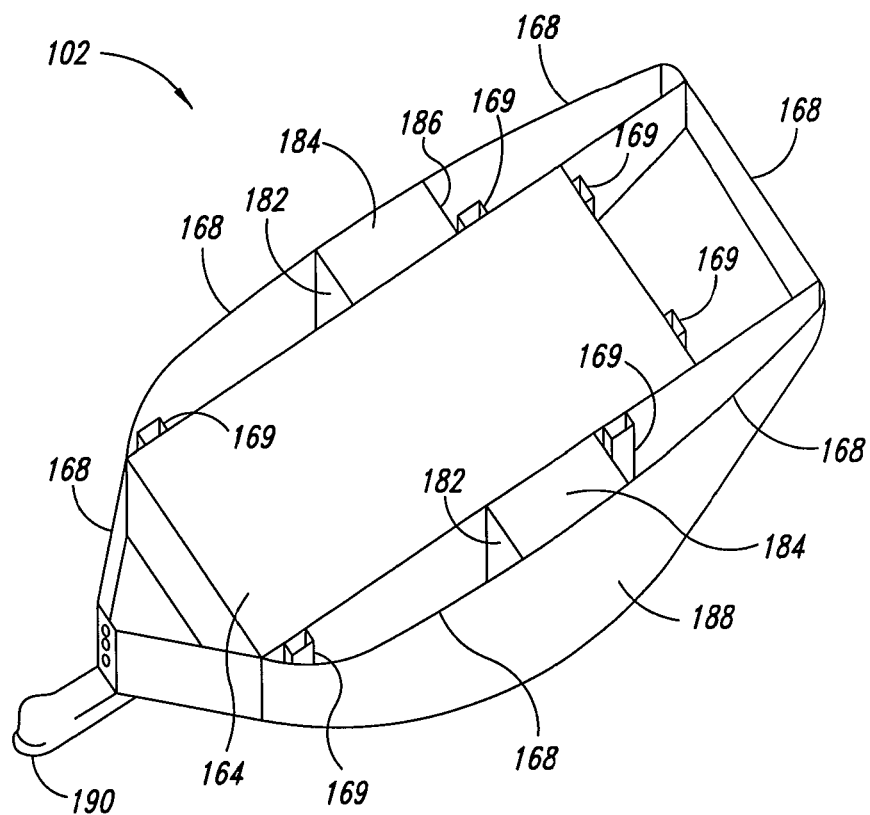
FIGS. 5A and 5B are schematic diagrams of one embodiment of the mobile energy storage apparatus showing storage compartments/crash structure, lid, means for securing various tops, and belly pans.
Figure 5B:
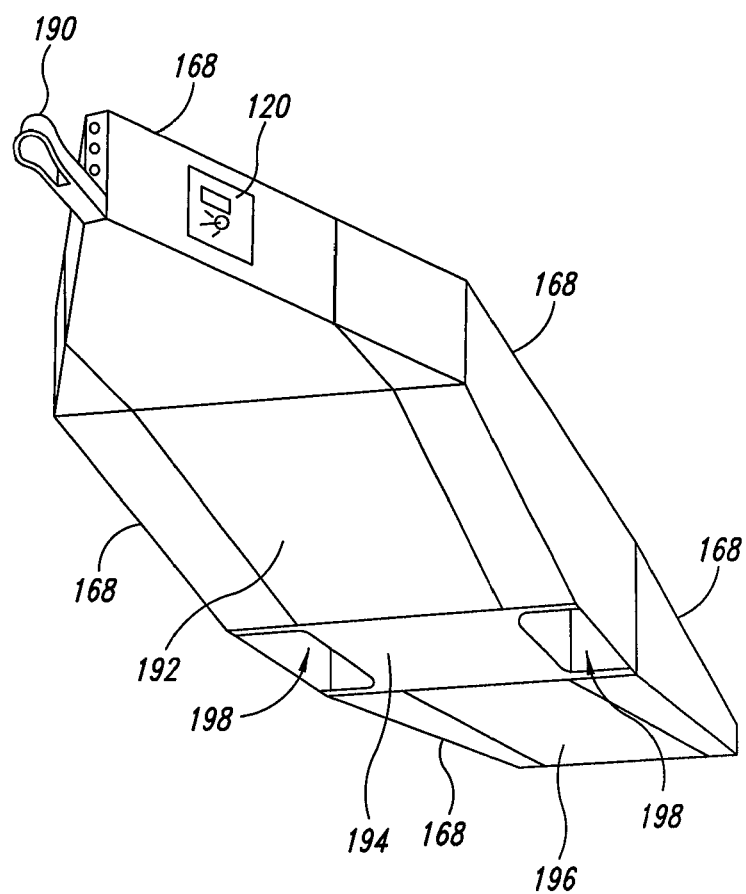

FIG. 5A and FIG. 5B show a combination storage compartment and crash structure 168, which could be attached around the sides of the lid(s) 164 or the apparatus frame 160. The storage compartment and crash structure 168 can be placed below the top surface of the lid(s) 164 and the mobile energy storage apparatus 102 as a whole as well as around the fender front surface 182, fender top surface 184, and fender rear surface 186. The storage compartment and crash structure 168 may be enclosed by one or more fender skirts 188, preferably used on a trailer embodiment for the mobile energy storage apparatus 102, to improve aerodynamics. Additionally, a front belly pan 192, a middle belly pan 194, and a rear belly pan 196 may be attached to a trailer embodiment of the mobile energy storage apparatus 102 which, in combination with fender skirt(s) 188, create wheel well opening(s) 198 that are the only exposed areas to airstream flow around the wheels. Having the storage compartment and crash structure 168 placed below the top surfaces of the lid(s) 164 and the mobile energy storage apparatus 102 allows the surface and area above the lid(s) 164 to be used for various top(s) 166, which will be discussed below. The storage compartment and crash structure 168 provides protection to the mobile energy storage apparatus 102 in the event of a crash or some other outside force or damage so that the damaged storage compartment and crash structure 168 can be removed and replaced and any damage to the mobile energy storage apparatus 102 will be minimized.

Top:

FIGS. 6A through 6J show different embodiments of at least one top 166 that could provide a weather tight space below which cargo could be stored between it and the lid(s) 164. Optionally, there would be different covers that interchange with the mobile energy storage apparatus 102 for different purposes, including, but not limited to: an aerodynamic top with room for cargo underneath which has solar panel(s), shown in FIG. 6A; a top(s) with solar panel(s) or wind turbine(s) or other mobile electrical generation devices 170 mounted to it, shown in FIGS. 6B and 6G; a utility top(s) configured to haul dirty cargo (such as waste, industrial equipment, or loose cargo such as gravel, dirt, or yard waste), shown in FIG. 6C; a camper top configured to be used when camping or having a mobile lodging location, shown in FIG. 6D; a rack attachment top configured to haul long objects such as boats, ladders, or long building materials, shown in FIG. 6E; a motor equipment transport top for hauling motorcycles, snowmobiles, ATVs, bicycles, automobiles etc., shown in FIG. 6F; a mobile electric vehicle charging station top, shown in FIG. 6H; a storage compartment and bike rack top(s), shown in FIG. 6I; a vehicle rear aerodynamic improvement top, shown in FIG. 6J; as well as a utility box top, which has many compartments for tools and materials (not shown), a flat bed top with tie-downs (not shown), an advertisement top for displaying billboards or other advertisements (not shown), a podium platform top with a PA system with speakers for making speeches or for a stage for concerts (not shown), a big screen display top for video or electronic still images (not shown), a search light top for advertising for an event or using for search and rescue operations (not shown), an air compressor top (not shown), a crane or cherry picker top (not shown), a barbeque top (not shown), and a top with harnesses underneath it that are legally rated to the same standards as seatbelts so that passengers could be fastened into the mobile energy storage apparatus 102 while it is moving and even possibly be in a laying position while harnessed in (not shown). This design allows for an essentially infinite list of add-on tops or other structures.

By allowing for many possible interchangeable tops 166 and pieces for the mobile energy storage apparatus 102, the overall mobile energy storage apparatus 102 is made much more useful for many different applications. Accordingly, the mobile energy storage apparatus 102 can easily adapt to the changing needs and desires of the user as well as the ever changing environment and technology.

FIG. 5A shows a device configured to secure various tops 169 in one embodiment. The device enables attachment of various tops 169 to either the apparatus frame 160 or the lid 164 and enables a fast and secure method for attaching and removing any of the various top(s) 166 compatible with the mobile energy storage apparatus 102.

Operation

General:

FIGS. 7A and 8 shows the mobile energy storage apparatus 102 having a preferred control interface 120 that allows the user to select the operational function mode(s) of the mobile energy storage apparatus 102. This control interface 120 is configured to enable selection of the correct circuit wiring for the function the mobile energy storage apparatus 102 is selected to perform at that time. Some possible function modes are: Off (there are no exposed terminals with live voltage that a user can access); AC In (this mode could charge the mobile energy storage apparatus 102 from an AC electrical outlet) operated with an AC input connection means 150, shown in FIG. 7A; DC Out (this mode could provide power from the mobile energy storage apparatus 102 to a DC power application such as an electric vehicle 100, or a DC powered building or home) operated with a DC output connection means 140, shown in FIG. 7A; AC Out (this mode could provide AC power to the grid or to an AC powered building or home) operated with an AC output connection means 158, shown in FIG. 7A; and DC In (this mode could provide power from an auxiliary energy storage device (such as a backup battery system for a solar array system) or from a DC electrical generation device(s) 170 (such as solar panels)) operated with a DC input connection 154, shown in FIG. 7A. The DC output connection 140, AC input connection 150, DC input connection 154, and AC output connection 158 may be combined in different ways so that one receptacle could serve the function of any combination, including all four. The mobile energy storage apparatus 102 may have multiple receptacles that serve the same function of any of the connections listed above.

Also, multiple combinations of the different function modes listed above may be used together at the same time. At the time the mobile energy storage apparatus 102 is connected to the host/tow electric vehicle 100 or other electric device or application, the electrical and communications connections (if there are hardwired communications connections between the mobile energy storage apparatus 102 and the electric vehicle 100 or other electric device or application rather than wireless communications) may be made at the same time by the design of the connection and coupling method.

By using a variable energy control device 110 that has a variable input and output voltage and current range, the voltage of the mobile energy storage apparatus' energy storage device(s) 112 or electrical generation device(s) 170 could be quite different from the acceptable voltage levels of the electric vehicle 100 or device to which the mobile energy storage apparatus 102 supplies power.

The variable energy control device 110 is configured to accept the input voltage and adjust it to an output voltage suitable for the electric vehicle 100 or other electric device. Although the mobile energy storage apparatus' supply voltage and energy capacity can be lower than that of the electric vehicle 100 or device it is connecting to, research and testing by the inventors has shown that using a higher supply voltage and energy storage capacity will yield higher overall system efficiency.

In one exemplary embodiment, a trailer containing an approximately 370 volt nominal high capacity 200 Ampere Hour (AH) electrochemical battery pack 114 could be fed through a variable energy control device 110, such as, but not limited to, a variable input and output battery charger, DC/DC converter, or power supply unit, and connected to the output in parallel to a host/tow electric vehicle's battery pack 114 with a nominal voltage of 330 and an amp hour capacity of 40 AH. In this example, the charger would use the power supplied from the 370 VDC battery pack 114 and adjust it to output a suitable charging voltage for the towing EV's 330 VDC battery pack 114.

In a further exemplary embodiment, a system is provided that includes an object that is at least powered by electricity, a rechargeable source of electricity coupled to the object, and a variable energy control device coupled to the rechargeable source and configured to receive variable input voltages and to control the rechargeable source of electricity to provide a variable voltage to the object. The rechargeable source may be mounted on or attached to the object, or it may be removably coupled to the object using a portable platform, such as a trailer. The control device could likewise be permanently attached or associated with the object or mounted on a portable platform, such as a trailer. Alternatively, both the rechargeable source and the control device can be attached permanently to the object or attached to a portable platform that is removably attached to the object.

In yet a further exemplary embodiment, an alternative source of electricity is also provided along with the rechargeable source and the control device. The alternative source of electricity is coupled to the rechargeable source and to the object as well as to the control device to supply electricity to either the object or the rechargeable source or both as directed by the control device. The control device can receive the variable input voltages directly from the object or the rechargeable source or the alternative source or various combinations thereof or via a sensor coupled to the object, rechargeable source, and alternative source, either individually or in any combination thereof. This would also apply to the embodiment that does not use the alternative source.

When implemented in vehicles, the system is designed to handle voltages ranging from 10 kilowatts up to and including 1 megawatt, depending on the application. For example, trucks would require voltages in the range of 10 kilowatts to 1 megawatt, and cars would be either 10 kilowatts to 50 kilowatts, 10 kilowatts to 75 kilowatts, or 10 kilowatts to 100 kilowatts. Other ranges include 3 kilowatts to 500 megawatts, 3 kilowatts to 250 kilowatts, 250 kilowatts to 1 megawatt, 1 megawatt to 20 megawatts, and 20 megawatts to 500 megawatts.

The system also can include at least one voltage detection device coupled to the object and the rechargeable source of electricity and that is configured to determine the voltage level of the electricity used by the object and provided by the rechargeable source and to provide the variable energy control device with the voltage level signals. The detection device can be formed integral to the control device and coupled to the rechargeable source and, when used, the alternative source via electrical conductors, or it may be mounted on each device, such as in the form of a sensor, and electrically coupled to the control device via electrical conductors or via wireless communication.

The system in another aspect includes at least one amperage range detection device coupled to the object and the rechargeable source of electricity that is configured to determine an amperage range of the electricity used by the object and provided by the rechargeable source and to provide the variable energy control device with amperage range signals.

The above-described system provides no only higher power levels than heretofore, it does so using a portable platform. The platform, as described herein, can be a trailer, luggage rack box, or other removable support for the system components or subcomponents as desired.

By being connected in parallel with the host/tow electric vehicle's battery pack 114 (that is positive to positive terminal and negative to negative terminal) the trailer could provide charging power even while the electric vehicle 100 is driving. By having a very powerful charger, for example with a 100 amp peak continuous output (note this should not be construed as limiting the amperage or power levels of the charger or variable energy control device 110), the overall system achieves high efficiencies.

The electric vehicle 100 also receives a substantial amount of electric power from the mobile energy storage apparatus 102, which keeps its onboard battery pack voltage very high with minimal or no load on the electric vehicle battery pack 114. This not only offsets the extra weight of towing the trailer but actually improves performance because the host/tow electric vehicle's drive system 116 effectively receives an unusually high voltage.

It would be as if the electric vehicle 100 were driving while being plugged into a very powerful wall outlet (something that would obviously not normally be feasible). Moreover, by using a higher voltage and higher capacity battery for the trailer's energy storage device(s) 112, the aforementioned charger (or other variable energy control device 110) would not need to work very hard to change its high voltage 370V input to a similarly high output voltage level for the host/tow electric vehicle 100. Also, even if the charger were moving 100 amps out of its 370V battery pack 114 and into the EV 100, this would be only half of the 1 C rate of 200 Amps that the 200 AH batteries could supply. At this 0.5 C rate, the 200 AH batteries would not be working very hard.

This improves efficiency because the host/tow electric vehicle 100 receives a higher than normal voltage as it is effectively being charged while it drives. In addition, the energy storage device(s) 112 in the mobile energy storage apparatus 102 are barely taxed by the comparatively low and steady power drain being placed upon them. Furthermore, in this example, when the user of the electric vehicle 100 arrives at his/her destination, there might still be a full charge in the electric vehicle's battery pack 114, allowing the mobile energy storage apparatus 102 to be disconnected from the host/tow electric vehicle 100 and switched to a charging mode where it is plugged into a power source and recharges its own energy storage device(s) 112. At such a time the user(s) can drive the host/tow electric vehicle 100 away to do other things and it will have the full range that it would normally have when fully charged. In the meantime, the mobile energy storage apparatus 102 is charged and the user is not inconvenienced by having to wait in one place while it charges.

Figure 12:
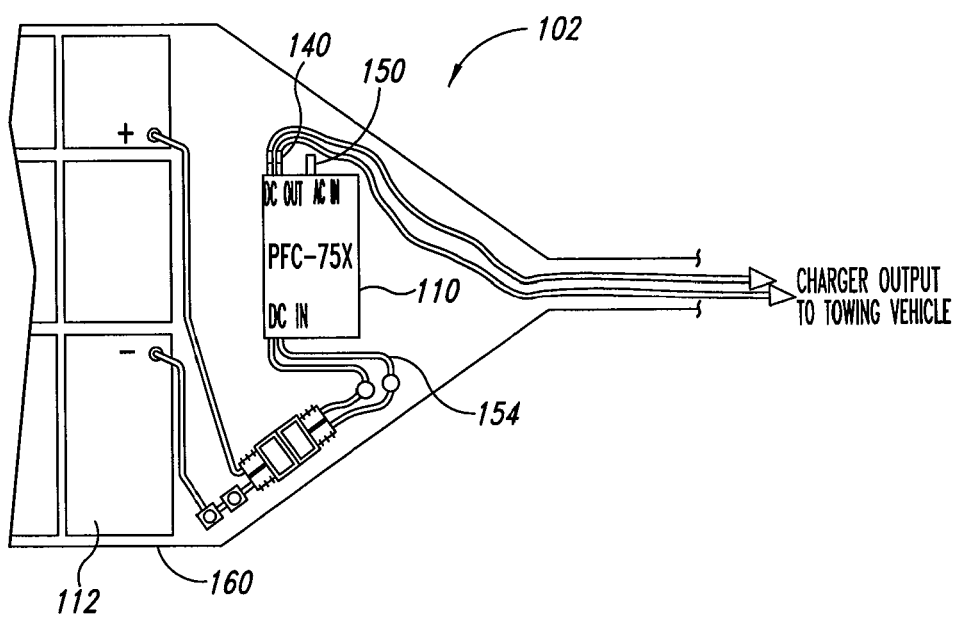
FIG. 12 is a schematic diagram of one embodiment of the mobile energy storage apparatus in the functional mode to output DC electrical power.

Electric Vehicles:

FIGS. 9A, 9B, and 12 show the mobile energy storage apparatus 102 connected to an electric vehicle 100 to provide power to it. The DC output connection 140 of the mobile energy storage apparatus 102 is connected in parallel with the onboard battery pack 114 of the electric vehicle 100 using a connector 108, shown in FIGS. 9A and 9B, to either supply electrical energy to the drive system 116 of the electric vehicle 100, to charge the battery pack 114 on board the electric vehicle 100, or both at the same time. The communications and control lines or wireless connections of the remote control interface 122, shown in FIGS. 2A and 10, are configured to be used while driving the electric vehicle 100 to monitor the remaining energy storage capacity of the energy storage device(s) 112 or to change the output voltage or current from the variable energy control device 110, depending on the state of charge of the electric vehicle battery pack 114 and the upcoming anticipated energy demand or regeneration (such as due to road conditions and terrain, wave and wind conditions, or snow and grade conditions).

The variable voltage and amperage output of the variable energy control device 110 means that the mobile energy storage apparatus 102 can be connected to a wide range of electric vehicles 100 with a wide range of battery pack or system voltages and specifications by simply adjusting the controls for the variable energy control device 110 using the remote control interface 122 or the control interface 120. This means that to make use of the mobile energy storage apparatus 102 with an electric vehicle 100, all that is required is proper adjustment of the controls of the variable energy control device 110 (if adjustment of the controls are not built into the connection(s) between the mobile energy storage apparatus 102 and the electric vehicle 100) and a means of connecting the mobile energy storage apparatus 102 to the electric vehicle 100 both electrically and mechanically. Additionally in some embodiments it is desirable to have a communication link either wired or wireless to a remote control interface 122 that may be carried by the user or set, mounted or otherwise integrated into the electric vehicle 100.

Electrical Power Connection to Vehicle:

The mobile energy storage apparatus 102 is connected to the host/tow electric vehicle 100 by means of a connector 108 to facilitate the transfer of power from the mobile energy storage apparatus 102 to the electric vehicle's battery pack 114 or to other systems individually or in combination. This electrical connection is made using a suitable connector 108 rated appropriately for the power levels that the electric vehicle 100 or other electric device(s) use. Ideally, electrical conductors would be connected to the most positive and most negative points of the battery pack 114 thereby being in parallel with the electric vehicle's battery pack 114 or system. A similar thing could be accomplished by connecting to the main positive and negative connections on the propulsion control system. It is also possible that an existing service connection or charge port on the electric vehicle 100 could be used. Such examples might include connecting directly to the EV's charging inlet, such as, but not limited to, a high power DC or AC connector like the SAE (Society of Automotive Engineers) J1772 or the Japanese developed CHAdeMO connections.

Alternately there could be an insulated flexible electrical connection affixed to the host/tow electric vehicle 100 and configured to extend to the mobile energy storage apparatus 102 or affixed to the mobile energy storage apparatus 102 and able to connect to a host/tow electric vehicle 100 or simply a removable multi-connector ended device such as at least one cable, which could be connected to both the host/tow electric vehicle 100 and the mobile energy storage apparatus 102. The electrical connection could even be integrated into the mechanical connection 190, shown in FIGS. 5A and 5B, so that the single act of connecting the mobile energy storage apparatus 102 to the host/tow electric vehicle 100 would accomplish both the physical mechanical strain connection and the electrical power transmission connection.

Additionally, there could be a circuit configured to signal the host/tow electric vehicle's pertinent specifications to the mobile energy storage apparatus 102 such that the mobile energy storage apparatus 102 would automatically adjust to provide power appropriately. There are many methods, some already used with electric vehicle charging connection protocols such as pilot signals and such with frequency generation and or diodes and resistor values. One of skill in the art could readily implement one of a number of ways to accomplish this type of signaling and so there is no need to go into great detail.

A pre-charge circuit or other circuit for the same purpose could be implemented to abate the issue of arcing when there is a large difference in voltage potential. There may be fuses, extra contactors or other protection means for isolating the mobile energy storage apparatus voltage as close to the power source(s) as possible. There could also be an isolation monitor, ground fault monitor and other such common EV safety measures incorporated into the device(s).

Inventor research has determined that devices intended to be powered primarily by AC power are often capable of functioning from DC power with little or no modifications. This was found to be true of some battery chargers and power supply units.

Figure 11:
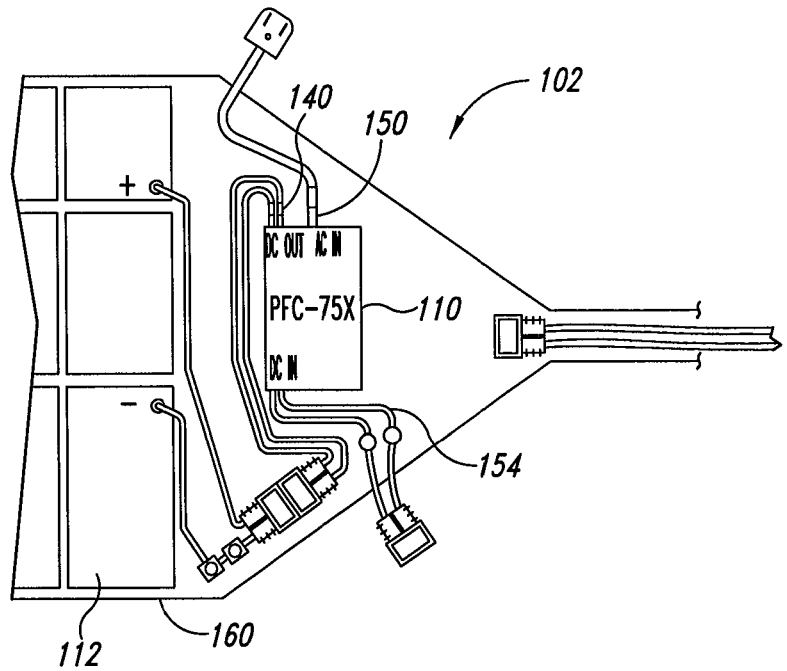
FIG. 11 is a schematic diagram of one embodiment of the mobile energy storage apparatus in the functional mode to input AC electrical power.

AC Electrical Connection:

FIG. 11 shows the mobile energy storage apparatus 102 connected to one or more AC electrical connection(s) to input energy into the energy storage device(s) 112 on the mobile energy storage apparatus 102. The AC input of the variable energy control device 110 is connected to an AC electrical connection(s) by way of the AC input connection 150. The variable energy control device 110 is configured to draw energy from the AC electrical connection(s) to store in the energy storage device(s) 112, and could be configured to automatically stop delivering power to the energy storage device(s) 112 when it/they reach(es) full capacity. Flow battery(s)/rechargeable fuel cell may be used in place of energy storage device(s) and a variable energy control device to perform the functions listed above.

AC Electrical Generation Device(s):

The mobile energy storage apparatus 102 may be connected to one or more AC electrical generation device(s) 170 to input energy into the energy storage device(s) 112 on the mobile energy storage apparatus 102. The AC input of the variable energy control device 110 would be connected to the AC electrical generation device(s) 170 by way of the AC input connection 150. The power output of the AC electrical generation device(s) 170 is thus conditioned through the variable energy control device 110 to store in the energy storage device(s) 112. There could be additional power conditioning or filtering means added into the circuit separately, in some cases on inputs or outputs or both. Flow battery(s)/rechargeable fuel cell may be used in place of energy storage device(s) and a variable energy control device to perform the functions listed above.

AC Powered Equipment and Facilities:

The mobile energy storage apparatus 102 may be connected to one or more AC electrical connection(s) to output energy into the electrical grid or to a building or home by way of the AC output connection means 158. The inverter 130 could output energy from the energy storage device(s) 112. Alternatively, a flow battery(s)/rechargeable fuel cell 118 could output energy to power a building or home that is without power due to a power outage, or to put power into the grid as part of a "vehicle to grid" (i.e., V2G) system where the demand for power on the grid is communicated to an energy storage device(s) 112 or a flow battery(s)/rechargeable fuel cell 118 with a compatible communication system onboard, and draws that power from the energy storage device(s) 112 or a flow battery(s)/rechargeable fuel cell 118 rather than power plants needing to increase their generation. AC equipment (such as appliances, power tools, etc.) could be connected to the AC output of the mobile energy storage apparatus 102 directly (or using a device which splits the outlet into multiple outlets) by way of the AC output connection 158 rather than requiring the mobile energy storage apparatus 102 to distribute electricity via a building or home. This could be used as a power source at remote sites without power when power is temporarily needed for tools or other equipment or appliances.

DC Powered Building or Home:

The mobile energy storage apparatus 102 may be connected to one or more DC electrical connection(s) to output energy into a DC powered building, home, or equipment (such as a welder) or to receive energy from the building or home. The DC input/output of the variable energy control device 110 or a flow battery(s)/rechargeable fuel cell 118 would be connected to the DC electrical connection(s) of the building, home, or equipment to provide power to them by way of the DC output connection means 140. The DC input/output of the variable energy control device 110 or a flow battery(s)/rechargeable fuel cell 118 could also be connected to the DC electrical connection(s) of a building or home to take power from the building or home (or from a solar, wind or other electrical generation device(s) 170 at the building or home) and store in the energy storage device(s) 112 or a flow battery(s)/rechargeable fuel cell 118 of the mobile energy storage apparatus 102.

Auxiliary Energy Storage Device(s):

The mobile energy storage apparatus 102 may be connected to one or more auxiliary energy storage device(s) (such as a solar photovoltaic backup battery system, an electric vehicle 100, another energy storage apparatus, etc.) to transfer energy to the auxiliary energy storage device(s) from the mobile energy storage apparatus 102, or to the mobile energy storage apparatus 102 from the auxiliary energy storage device(s). If the auxiliary energy storage device(s) is an electric vehicle 100, the mobile energy storage apparatus 102 could be towed to the location of that electric vehicle 100 to provide power to it if the electric vehicle 100 were out of power and was stranded. After transferring energy from the mobile energy storage apparatus 102 to the stranded electric vehicle 100, the vehicle would have enough capacity to make it to a location where it could charge, or possibly make it to its final destination. Power could also be transferred into the mobile energy storage apparatus 102 from another electric vehicle's battery pack 114.

on or Off-Board Electrical Generation Device(s):

The mobile energy storage apparatus 102 may be connected to one or more onboard or off-board electrical generation device(s) 170, such as photovoltaic panel(s), wind turbine(s), fuel cell(s), hydropower turbine(s), thermal powered turbine(s), geothermal generation, tidal power generation, wave power generation, nuclear reactor(s), human power or other living creature or organism power, or any DC power source. The AC or DC input/output (depending on the electrical power output of the electrical generation device(s) 170) of the mobile energy storage apparatus 102 would be connected to the electrical generation device(s) 170 by way of the AC input connection 150, the AC output connection 158, the DC input connection 154 or the DC output connection 140 to provide power to store energy in the energy storage device(s) 112 or a flow battery(s)/rechargeable fuel cell 118 on the mobile energy storage apparatus 102.

Some of the electrical generation device(s) 170 could be on board the mobile energy storage apparatus 102 to generate power to store in the energy storage device(s) 112 or a flow battery(s)/rechargeable fuel cell 118 when the mobile energy storage apparatus 102 is stationary or when it is moving. Other electrical generation devices 170 that could not be mounted onboard the mobile energy storage apparatus 102 could provide power to store in the mobile energy storage apparatus 102 when it is stationary.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a movable object that includes a battery pack and is at least in part powered by electricity from the battery pack;
    a towable portable platform removably attached to the object;
    a rechargeable source of electricity mounted on the platform and configured to be electrically coupled to the object to supply electricity to the object; and
    a variable energy control device mounted on the platform that is electrically coupled between the rechargeable source of electricity and directly connected electrically to the battery pack of the movable object and configured to control the rechargeable source of electricity to provide a variable voltage and amperage to the movable object without the use of a charge controller on the movable object, the variable energy control device being electrically compatible with objects having different electric battery pack voltages.

2. The system of claim 1, further comprising at least one voltage detection device coupled to the object and the rechargeable source of electricity that is configured to determine the voltage level of the electricity used by the object and a voltage level provided by the rechargeable source and to provide the variable energy control device with voltage level signals.

3. The system of claim 1, wherein the system includes at least one amperage range detection device coupled to the object and the rechargeable source of electricity that is configured to determine an amperage range of the electricity used by the object and provided by the rechargeable source and to provide the variable energy control device with amperage range signals.

4. The system of claim 1, further comprising an alternative source of electricity coupled to the object, the rechargeable source, and the control device and configured to supply electricity to the rechargeable source of electricity or the object.

5. The system of claim 4, wherein the alternative source is mounted on the portable platform.

6. The system of claim 1 wherein the rechargeable source is configured to supply power to the object in the range of 3 kilowatts up to and including 500 megawatts.

7. The system of claim 1 wherein the rechargeable source is configured to supply power to the object in the range of 3 kilowatts up to and including 250 kilowatts.

8. The system of claim 1 wherein the rechargeable source is configured to supply power to the object in the range of 250 kilowatts up to and including 1 megawatt.

9. The system of claim 1 wherein the rechargeable source is configured to supply power to the object in the range of 1 megawatt up to and including 20 megawatts.

10. The system of claim 1 wherein the rechargeable source is configured to supply power to the object in the range of 20 megawatts up to and including 500 megawatts.

* * * * *